May 25, 1926.

E. B. HIGGINS

ROCESS OF TREATING MINERALS

Filed June 20, 1925

INVENTOR
Eric. B. Higgins
BY
Gill & Jennings
ATTORNEYS

May 25, 1926.

E. B. HIGGINS 1,586,365

PROCESS OF TREATING MINERALS

Filed June 20, 1925   3 Sheets-Sheet 2

May 25, 1926.  
E. B. HIGGINS  
1,586,365  
PROCESS OF TREATING MINERALS  
Filed June 20, 1925   3 Sheets-Sheet 3

Patented May 25, 1926.

1,586,365

UNITED STATES PATENT OFFICE.

ERIC BERKELEY HIGGINS OF LONDON, ENGLAND, ASSIGNOR TO UNITED WATER SOFTENERS LIMITED, OF LONDON, ENGLAND, A BRITISH COMPANY.

PROCESS OF TREATING MINERALS.

Application filed June 20, 1925, Serial No. 38,525, and in Great Britain September 10, 1924.

This invention relates to the treatment of granular or powdered materials consisting of grains or particles of varying sizes with a view to grading the material or separating the constituent parts of different sizes. The invention has particular reference to the treatment of base exchange zeolite-like materials and particularly to a process for the separation of the useful portion of such materials from the mineral deposit from which they are obtained. The product in the natural condition, for example in the case of glauconite, contains in addition to the base exchange substance itself varying quantities of bodies which are inactive as regards base exchange and such bodies must be separated from the base exchange material proper before the latter can be used for practical purposes.

Furthermore, the base exchange material itself occurs in varying degrees of fineness and it is desirable that the finer grades of this material shall be separated from those in a coarser state of sub-division in order that filter beds may subsequently be obtained of the active base exchange material with suitable porosity. The coarser particles are in practice more useful when employed in the usual type of base exchange apparatus.

The inactive impurities which so far have caused the greatest difficulty in separation from the glauconite are the clay-like bodies which are retained by the base exchange material with the utmost tenacity. The raw glauconite as obtained from the mineral deposit may be washed in a rapid stream of water, for example, 10 cwt. of the raw material may be washed in 1000 gallons of water per hour in a shelved rotating drum and after three hours an effluent is obtained which is still strongly contaminated with the clay-like materials to an extent which is sufficient to make it impossible to use the material in commercial water treatment even after the glauconite has been subjected to a stabilizing treatment, for example, by baking without subsequent separation of the finely divided impurities by washing and so forth.

It is the main object of the present invention in its application to the purification of base exchange materials, to separate the clay-impurities from the base exchange material extremely rapidly by means of a mechanical separating treatment and preferably by means of a chemical treatment first and the invention also aims at making it possible to use a small volume of washing water and in cases in which it is found necessary, to grade the base exchange material proper in accordance with its own size of grains with great economy in labour and mechanical power.

According to the present invention, the raw material to be graded is allowed to fall through one or more columns of liquid which itself is maintained in motion at a steady velocity, arranged so that the said velocity is greater than the natural rate of fall of the lighter constituents which it is desired to separate from the coarser, so that the finer or lighter constituents are removed in the direction of flow of the liquid from the coarser portions which fall against the direction of flow of the liquid. In the case of the raw glauconite the material is subjected, preferably after rough screening, to the action of a solution which is faintly alkaline, such as sodium carbonate or caustic soda, or it may be even of common salt of such a strength that the solution exerts a peptising action and deflocculates the clay-like impurities, subsequent to which the material is subjected to the selective mechanical action of one or more columns of liquid which may be weak alkaline solution, this treatment being carried out as indicated above. Even in the case of such base exchange materials as glauconite, however, a very considerable separation of the fine undesirable constituents is effected even without the peptising chemical action above referred to. When the material is subjected to the action of two or more columns in succession, the rates or flow of the solution in the two columns is made different, the speed in the second column being greater so that in the second column it is only really the coarse particles which fall against the flow of the liquid and grains of medium dimensions are carried up and delivered at the top of the second column.

In order that the invention may be clearly understood and readily carried into effect, some examples of plant for carrying out the invention will be described more fully with reference to the accompanying drawings, wherein:—

Figure 4 is a similar diagram of a further modification in which there are three separating columns, and finally Figure 5 is a diagram showing a number of separating columns incorporated in a single unit of the apparatus.

Figure 1:
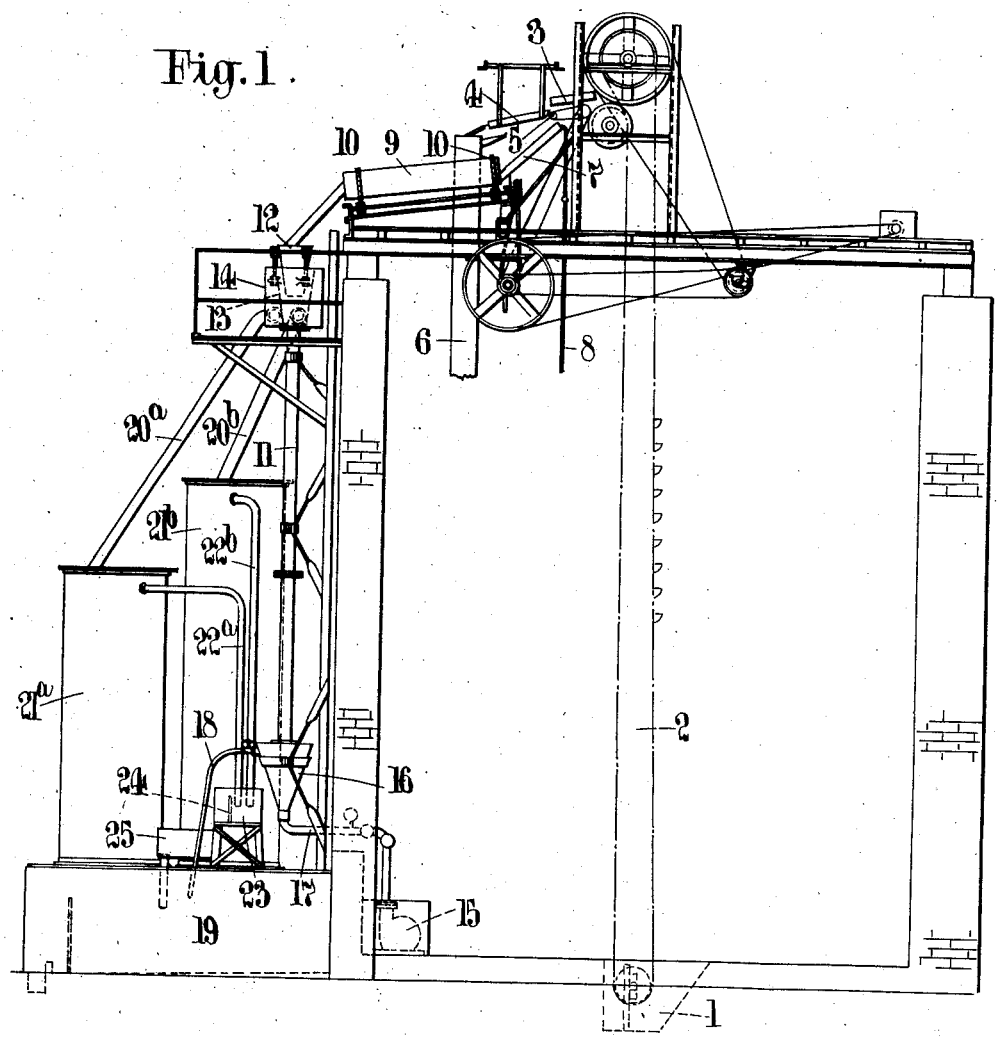
Figure 1 is a side elevation of a preferred form of plant for the treatment of raw glauconite in accordance with the invention.

Referring first of all to Figure 1, 1 is a pit in which the raw glauconite is placed from sacks. It is a pit at the foot of a bucket elevator 2, the latter carrying the glauconite to the top and depositing the material upon a tray 3. The glauconite from this tray slides on to a shaker screen 4 oscillated by means of a crank 5. The coarse refuse does not pass through the screen 4, but falls off at the forward edge through a chute 6 for the waste material. The finer portions containing the glauconite capable of use in water softening pass through the screen 4 on to a mixing chute 7. It is washed from that chute by means of the peptising solution passing up through a pipe 8 into a tubular mixer 9 provided with rings of teeth 10 by means of which it is maintained in continuous steady rotation. It is in this form of apparatus in this mixer tube wherein peptising of the clay-like constituents takes place.

It has already been said that the peptising may take place by means of faintly alkaline solution, or by means of a solution of common salt. The strength of the alkaline solution necessary varies somewhat according to the source of the material and should in practice be verified by direct tests in the laboratory upon the material to be treated. It is found, however, to be of the magnitude of five to fifty times millinormal strength. For example, with one sample of American glauconite three-quarters of a pound of caustic soda per ton of water was found to be the most suitable strength of alkali in the solution. In any particular instance, however, the concentration of the solution for peptisation is usually confined to a fairly narrow range. If the concentration of alkali is increased, the clay passes progressively from the condition of flocculation up to a maximum condition of peptisation and then back again to flocculation. In practice it is only necessary that the whole mass of the material shall be thoroughly wetted, but excess over the minimum amount of alkaline solution in the tube 9 has no deleterious effect upon the material as regards the peptisation phenomenon in itself. The amount of alkaline solution of the strength mentioned above which is allowed to pass through the mixer tube 9 is 200 gallons per ton of glauconite passing from the chute 7 into the tube 9.

The wet material passes from the mixer tube 9 into the separating column. This consists of a riser pipe 11 surmounted by a pair of cones, the central cone 12 being adjustable vertically relatively to the outer cone 13 for a purpose which will be referred to below. The outer cone 13 is flanged at its lower end and bolted to the top of the riser pipe 11 and is also surrounded by a tank 14. The wet glauconite is delivered into the upper end of the central cone 12 and falls down into the riser pipe 11. In the latter there is a steady upward flow of water produced by means of a centrifugal pump 15. It has been found that if the soaked mass be allowed to fall vertically by virtue of its own density into a column of water moving upwards at a velocity of 1.75 centimeters per second, all the constituents including clay and the fine grades of base exchange material which on account of their fineness are not suitable for use in the filter beds as most generally employed with base exchange materials, will be carried upwards with the stream of water. This results because their natural rate of fall in water is less than 1.75 centimeters per second. On the other hand, the coarser particles will continue to fall in the opposite direction to the flow of the liquid. In this manner a separation is effected, the completeness of which depends upon the maintenance of constant conditions, particularly as to the flow of the liquid and the supply of the soaked glauconite, although eddy current movements and similar irregularities in the upward flow of the column of water should be avoided and other conditions should be observed, such as the avoidance of two large a proportion of solid matter in the ascending liquid column together with a sufficient diameter of the ascending column to eliminate considerable skin friction effects having regard to the velocity of flow of the liquid and to the time over which the material is submitted to the selective action of the water column; the latter, of course, depends upon the length of the column.

At the foot of the riser pipe 11 there is an expanded space formed by a conical vessel 16 into which the inlet pipe 17 for the water passes at the foot. The purpose of this is to enable the water to be admitted without setting up considerable eddy currents. The coarser material falls into this vessel and is discharged in the form of a continuous stream of thick pulp through an outlet pipe 18 through which it is forced by a proportion of the water entering through the pipe 17. The pulp from the pipe 18 falls into rectangular bins 19 and is there partly dried and is ready for carting away.

The lighter constituent parts rise up with the column of liquid in the pipe 11 and overflow at the edge of the outer cone 13 into the tank 14. Thus these materials and the liquid pass through the annular space between the cones 12 and 13 and the cross-section of this annular space may be accurately adjusted by raising or lowering the central cone 12 relatively to the cone 13. The liquid with the lighter constituents passes down through one or other of the outlet pipes $20^a$ and $20^b$ into one or other of the cylindrical receptacles $21^a$ or $21^b$. Two such receptacles are used so that the process can be continuous, one receptacle being in use while the other is being emptied. For this purpose the pipes $20^a$ and $20^b$ each have a valve (not shown in the drawings) enabling either one of the receptacles to be cut out of action at any time. Again, the provision of two receptacles $21^a$ and $21^b$ enables a single apparatus to be used for washing two different materials. For example, glauconite can be washed and the fine material received in one of the receptacles when the starting material is raw glauconite and subsequently glauconite which has previously been stabilized by baking can be washed and the separated fine material received in the other receptacle.

The greater part of the fine material is left in either the receptacle $21^a$ or the receptacle $21^b$, but the water passing in with it together with a certain quantity of very fine mud passes out through a pipe $22^a$ or $22^b$ into a tank 23 which is furnished with a weir 24 over which the liquid escapes into a further tank 25. The purpose of this weir is to enable the velocity of flow of the water through the apparatus to be checked. Obviously it is no use inserting a meter in the pipe 17 as the water passing through that pipe does not all rise through the riser pipe 11, part of it passes out with the sand through the pipe 18.

If the supply of water for the peptising solution through the pipe 8 be hard it may be rendered free from line products which are harmful to the process and alkali may be economized by previous treatment of the water supply by softening it with base exchange zeolite-like material. The soaked material and the dry glauconite may be conveyed by other means than a belt conveyor, for example it may be conveyed or elevator, for example it may be conveyed by gravity flow or hydraulically. In the latter case, of course, alkaline solution should be used. Once the speeds of flow of the solution and of feed of the glauconite have been adjusted to the correct amount, the apparatus requires practically no supervision.

Figure 2:
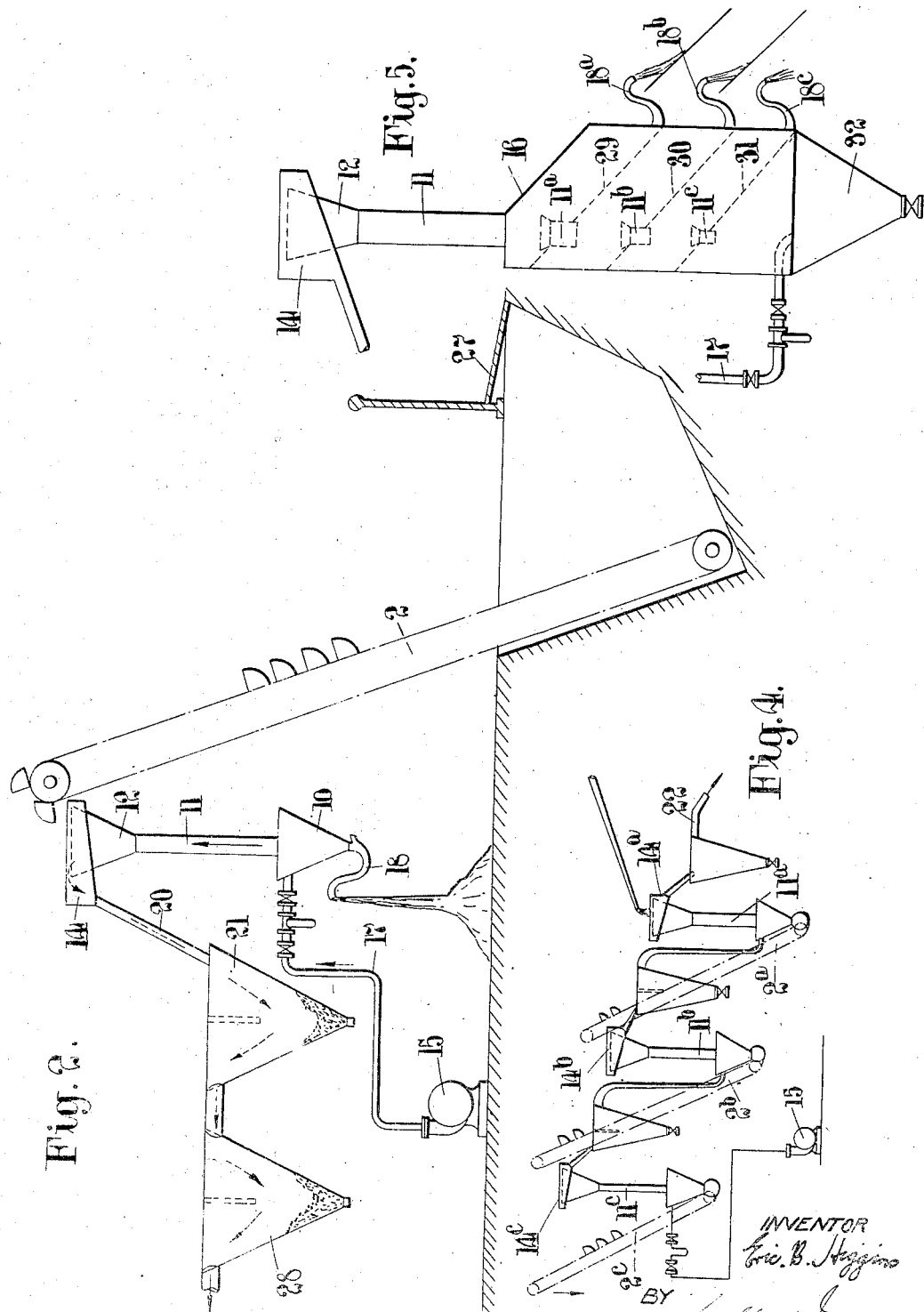
Figure 2 is a side elevation showing purely diagrammatically a plant in which the process is slightly modified.

Figure 2 shows an apparatus diagrammatically in which there are small modifications. The raw material is loaded into underground tanks 26 through sieves 27 for the removal of gross impurity. Such a tank 26 may have conveniently a capacity of one day's output of the separating apparatus to be employed. Assume that the tank 26 contains 12 tons of the screened glauconite; the latter is allowed to stand for 12 hours or longer in the tank with sufficient of the alkaline solution of the strength indicated above for easy soaking. For example, with the 12 tons of screened mineral about 9 tons of water may be added containing about 6¾ pounds of caustic soda.

After the thorough soaking and standing the soaked mineral mass is raised from the tank 26 by the belt conveyor 2 and discharged at constant speed into the cone 12 at the top of the separating column 11. The process then goes on which is described in connection with Figure 1 and as far as possible the same reference numerals have been employed.

In this case the water entering the conical vessel 16 by way of the pipe 17 is shown coming in at the top of the vessel 16 and the coarser sand is shown discharged through the pipe 18 in the form of a swan neck at the bottom of the container 16. The liquid containing the fine constituents is shown as passing through two receptacles 21 and 28 in series, the receptacle 28 receiving some of the fine mud which is carried over from the receptacle 21.

If the coarser material separated in the apparatus shown in Figures 1 and 2 be introduced into a column of water or alkaline solution moving upwards at a speed of 16 centimeters per second, only the heavy particles will fall in the opposite direction to the movement of the solution and in general it will be found that such heavy particles are devoid of base exchange properties. Clearly therefore, if the soaked mineral mass be subjected in succession to the effect of columns of alkali solution or water moving respectively at 1.75 centimeters per second as described with reference to Figures 1 and 2 and then at 16 centimeters per second, the commercially useful fraction of the natural mineral can be separated from the clay and the finely divided constituents in the first column as described in connection with Figures 1 and 2 and from the heavy impurities in the second column. It is also equally clear that by means of intermediate treatments at intermediate speeds, the commercially useful fraction for base exchange can be separated into any desired number of grades with respect to their natural rates of fall and therefore roughly with respect to their size. As, however, the separation of the clay and the finely divided particles is of much more importance commercially in the case of base exchange materials than precise grading of the constituent parts of the useful fraction of the mineral, it is advisable when carrying out the present invention that a relatively longer time should be allowed for the former separation than for the latter when more than one column is used. In other words, a longer column should be used in practice for separating out the clay from the finely divided particles. Furthermore, until the clay-like material is finally removed, the liquid mass should not be allowed to come into contact with water which is more weakly or more strongly alkaline than that indicated above, as otherwise the clay-like impurities may again become flocculated and as a consequence may not be separated from the commercially useful fraction of the mineral by the differential grading action of the alkali solution and the mineral mass moving in counter flow.

Figure 3:
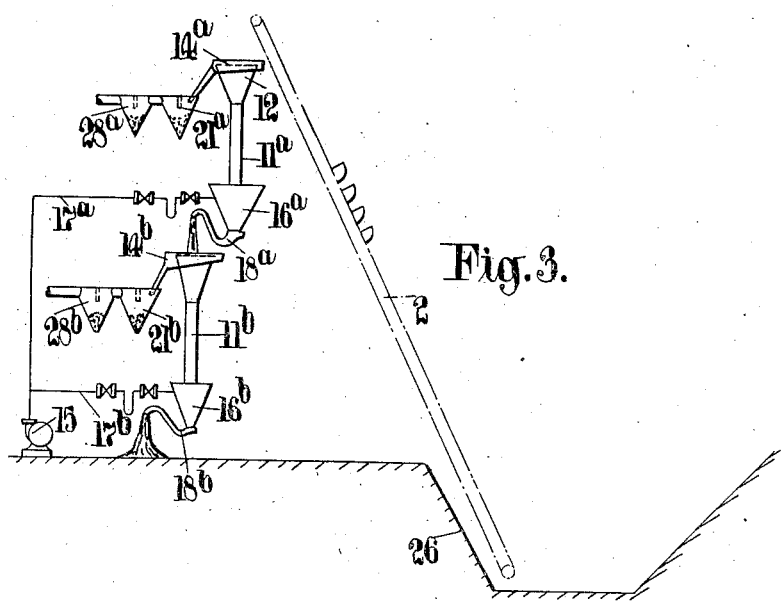
Figure 3 is a similar diagram showing a process in which there is a passage through two separating columns in series.

As a matter of fact in Figure 3 an apparatus is shown for subjecting the material to two separation processes. The apparatus, generally speaking, is similar to that shown in Figure 2 except that there are two separating columns in riser pipes 11ª and 11ᵇ. The material is supplied by the conveyor 2 from the underground tank 26 to the cone 12 at the head of the pipe 11ª. The velocity of flow in this pipe may be 1.75 centimeters per second, as already described, and the velocity in the second pipe 11ᵇ may be 16 centimeters per second. This is arranged by proper selection of the cross sections of the pipes 11ª and 11ᵇ and/or by proper manipulation of the valves in the two water supply pipes 17ª and 17ᵇ. The remaining parts of the apparatus have reference numerals as far as possible corresponding to those in Figure 2 and without further description it will be realized clearly that the clay-like and useless fine constituents pass over into the receptacles 21ª and 28ª from the top of the riser pipe 11ª and that the remainder of the material sinks into the vessel 16ª at the foot of that column and then is passed into the second column in the riser pipe 11ᵇ. Thus the coarse materials devoid of base exchange properties pass out at the foot of the column 11ᵇ through the vessel 16ᵇ and the useful constituents with base exchange properties pass out at the head of the column 11ᵇ into the tank 14ᵇ and into the receptacles 21ᵇ and 28ᵇ. Thus the middlings containing the fraction useful for practical base exchange are separated both from the fine constituents and clay-like materials and also from the heavy constituents.

In the further form of apparatus in accordance with the present invention illustrated in Figure 4, the same volume of alkaline solution is passed by means of the pump 15 in succession through three separating columns 11ᶜ, 11ᵇ and 11ª in counter flow to the movement of the solid mineral mass. The latter is first supplied at the head of the column 11ª in which the velocity of the rising liquid is lowest. Thus the clay and fine particles flow away from the tank 14ª at the top of the column 11ª. The remaining coarser material is delivered to an elevator 2ª which carries it to the top of the second column 11ᵇ and in this column the light middlings would be carried to the top and discharged from the tank 14ᵇ, while the remainder of the material falls to the bottom, the velocity of flow in the column 11ᵇ being adjusted to a suitable value for this purpose. The coarser material from the bottom is carried by a second elevator 2ᵇ to the head of the third column 11ᶜ. In this column the heavy middlings flow away from the tank 14ᶜ at the top and the heavy inactive constituents fall to the bottom from where they are removed by a further elevator 2ᶜ. The alkaline solution after passing through the three columns in the order 11ᶜ, 11ᵇ, 11ª flows to waste at 22. It will be noted that as the speed in the third column 11ᶜ is to be the greatest that column has the smallest cross-section, the second column 11ᵇ having a larger cross-section and the first column 11ª a larger cross-section still. Thus as the separated solid material passes through the first, second and third columns in succession it meets solution flowing at successively higher speeds.

It has already been indicated that the grading operations of the fraction commercially valuable for base exchange purposes are more readily accomplished than the separation of the fine constituents and clay-like materials. Thus the grading of the base exchange material itself need not be carried out to such a thorough extent as the separation of the clays so that the length of the selecting columns for grading the base exchange material may be relatively much smaller than that necessary for separating out the clay and the extremely fine particles. An apparatus is shown in Figure 5 for carrying out several separations in the same unit of the apparatus. The crude pulp is supplied to the hopper 12 at the top of a relatively long separating column 11, at the foot of which is an expanding vessel 16. The vessel 16 has a sloping partition 29 in which is mounted a short column 11ª of rather smaller cross-sectional area than the column 11. This short column 11ª opens out into a further expanded space between the sloping partition 29 and a further partition 30. The partition 30 carries a third separating column 11ᵇ also quite short and slightly smaller in cross section than the column 11ᵃ. The column 11ᵇ opens out at the bottom into a space between the partition 30 and the third partition 31, a fourth supporting column 11ᶜ being mounted in the partition 31 and also being quite short and slightly smaller in cross-section than the column 11ᵇ. The column 11ᶜ opens out at the bottom into a space formed by the lower part of the vessel 16 and the initial supply of alkaline solution is admitted to this space through the pipe 17. The bottom part of the vessel 16 is formed as an inclined chute or funnel 32 for discharging the heavy inactive particles of the crude glauconite. Thus the clay and extremely fine particles are separated out by the first or upper relatively long column in which the rate of flow is adjusted to a suitable value for this purpose. These clay-like and fine impurities pass out at the top of the column 11 into the tank 14. The particles which are not quite so fine are separated out at the top of the second column 11ᵃ and escape at the swan neck 18ᵃ. The second short column 11ᵇ separates out the fine and light middlings which escape at 18ᵇ and the third short column 11ᶜ separates out the heavy middlings which escape at 18ᶜ, while, as already indicated, the heavy inactive materials pass to the chute 32 at the bottom.

It has already been indicated that the invention is not limited to any of the forms of apparatus described and in the treatment of materials other than base exchange bodies, of course, the peptising treatment has no part and, as already mentioned, even in the case of the washing and grading of base exchange bodies, such as glauconite, the peptising step can be omitted although the thoroughness of separation is then to some extent sacrificed. It is only essential in accordance with the invention that the apparatus be suitable for allowing the mass to be separated to be submitted to the selective action of a column or of a number of columns in succession of liquid moving with regulated speeds, so arranged that those portions of the mass, the natural rate of fall of which is less than the counter-flow of the respective liquid columns, are conveyed by each column in the opposite direction to those portions having a greater rate of fall than that of the movement of the liquid column in the opposite direction and that those portions which are so moved in opposite directions shall be collected separately.

Having thus described my invention, what I claim as new and desire to secure by Letters Patent is:—

1. A process for separating out the clay constituents of crude glauconite from the mineral proper, consisting in treating the crude glauconite with a peptising agent and then subjecting it to the selective action of a column of liquid rising at uniform speed so that the particles or grains of the mineral proper whose natural rate of fall is greater than the upward speed of the liquid column descend and are thereby freed from the clay constituents whose natural rate of fall is less than the upward speed of the liquid column which are consequently carried up by the latter.

2. A process for separating out the clay constituents of crude glauconite from the mineral proper, consisting in subjecting the crude glauconite to the selective action of an upwardly flowing column of weak alkaline solution rising at uniform speed so that the particles or grains of the mineral proper whose natural rate of fall is greater than the upward speed of the liquid column descend and are thereby freed from the clay constituents whose natural rate of fall is less than the upward speed of the liquid column which are consequently carried up by the latter.

In witness whereof I hereunto subscribe my name this 12th day of June, 1925.

ERIC BERKELEY HIGGINS.